United States Patent

Murata et al.

Patent Number: 5,886,819
Date of Patent: Mar. 23, 1999

[54] ANTIGLARE MATERIAL AND POLARIZING FILM BY USING THE SAME

[75] Inventors: Chikara Murata; Shinichi Takahashi; Yukinori Sakumoto, all of Shizuoka, Japan

[73] Assignee: Tomoegawa Paper Co., Ltd., Tokyo, Japan

[21] Appl. No.: 736,757

[22] Filed: Oct. 25, 1996

[30] Foreign Application Priority Data

Oct. 27, 1995 [JP] Japan ................................. 7-279960

[51] Int. Cl.$^6$ ......................... G02B 5/30; G02B 27/00
[52] U.S. Cl. ..................... 359/483; 359/185; 359/493; 359/601
[58] Field of Search ........................ 359/599, 483, 359/485, 493, 601, 602, 608; 348/834; 313/478, 479

[56] References Cited

U.S. PATENT DOCUMENTS

| | | | |
|---|---|---|---|
| 2,122,178 | 6/1938 | Land | 359/599 |
| 4,114,983 | 9/1978 | Maffitt et al. | 359/599 |
| 4,731,558 | 3/1988 | Haisma et al. | 313/478 |
| 4,753,516 | 6/1988 | Doi et al. | 359/609 |
| 4,972,117 | 11/1990 | Adler et al. | 313/478 |
| 5,099,171 | 3/1992 | Daiku et al. | 313/479 |
| 5,122,709 | 6/1992 | Kawamura et al. | 313/479 |
| 5,602,947 | 2/1997 | Neuberger | 385/31 |
| 5,709,922 | 1/1998 | Ono et al. | 428/156 |
| 5,773,126 | 6/1998 | Noritake et al. | 428/143 |

FOREIGN PATENT DOCUMENTS

| | | | |
|---|---|---|---|
| A 57-4001 | 1/1982 | Japan | 359/894 |
| 63-298201 | 12/1988 | Japan | 359/601 |

OTHER PUBLICATIONS

Japanese Industrial Standard, *Surface roughness—Definitions and designation,* JIS B 0601–1994, Translated and Published by Japanese Standards Association, Jan. 1994.

*Primary Examiner*—Cassandra Spyrou
*Assistant Examiner*—John Juba, Jr.
*Attorney, Agent, or Firm*—McDermott, Will & Emery

[57] ABSTRACT

An antiglare material capable of exhibiting an excellent antiglare effect by preventing imaging reflection of an external light source and suitable for an image display with sharpness and high resolution as well as a polarizing film by utilizing the same. The antiglare material of the invention is a transparent substrate of which at least one of the surfaces is roughened to a predetermined surface roughness. The polarizing film of the invention is a laminate consisting of a first protective layer which is the above defined antiglare material and a second protective layer laminated onto the unroughened surface of the first protective layer with intervention of a polarizing substrate. The roughened surface of the transparent substrate in the above mentioned antiglare material, which may be used in the above described polarizing film, preferably has a haze value in the range from 1 to 25 according to JIS K7105 and the transparent substrate is preferably a transparent film.

6 Claims, 3 Drawing Sheets

ANTIGLARE MATERIAL AND POLARIZING FILM BY USING THE SAME

BACKGROUND OF THE INVENTION

1) Field of the Invention

The present invention relates to an antiglare material used on an image display such as LCDs, CRTs and the like to exhibit an excellent antiglare effect on the displayed images as well as to a polarizing film by the use thereof.

2) Description of the Related Art

It is a very common technological practice under rapid progress in recent years that various kinds of image display devices, referred to simply as "displays" hereinafter, including LCDs and CRTs as typical examples are widely employed in a variety of fields for the exhibition of images and patterns as in television sets, computer terminals and the like. While one of the key problems in the initial stage of their development was to accomplish conversion of the black-and-white displays into colored displays, it is a recent trend in the development works to accomplish upgrading of the image quality of the displays with higher and higher resolution as represented by the movement toward the new television broadcasting system of increased image resolution in addition to a further target of the development works to accomplish saving of the electric power consumption in the displays. These innovative display systems are expected to play a very important role in the man-machine interphases with wider and wider prevalence along with the advent of the era of so-called multimedia including, in particular, a variety of portable terminals of communication systems represented by portable telephones, PHS, and the like.

It would be a due expectation that LCDs are the only displays which occupy the market of the displays for portable terminals since they are the lightest in weight and can be designed with compactness along with their versatility for any types of displays. Since these portable terminals are frequently used outdoors, it is important to ensure good visibility of the images exhibited on the display screen even under daylight by suppressing reflection of the external light incident on the display screen such as the sunlight as completely as possible. As being urged by the requirement in these fields, it is eagerly desired to develop an efficient antiglare means on the display screen which prevents imaging reflection of external light sources such as the sun, fluorescent lamps and the like on the display screens.

The most conventional way in the prior art to accomplish the antiglare effect of this type is to use a glass plate having a ground or matted surface and the like by which the incident light is scattered or diffused to exhibit a vignetting effect on the images. The scattering or diffusing effect on the light is accomplished usually when the surface for the incident light is matted or roughened as a basic principle. Several different methods are undertaken for the roughening treatment of a substrate surface including the direct roughening methods such as sandblasting, embossing treatment and coating treatment by which a coating film containing fine filler particles dispersed therein is formed on the substrate surface as well as a method in which a surface layer having porosity by way of the so-called "sea-and-islands" structure is formed on the substrate surface.

While a high degree of resolution of the image display can be accomplished mainly by increasing the distribution density of the image-forming dots, increase of the distribution density of the image-forming dots is necessarily accompanied by an increase in the fineness of the height difference of and distance between the irregularity protrusions on the roughened surface. Further, sharp display images without glittering cannot be obtained unless the evenness in the distribution of the surface irregularities is minimized. In addition, a good antiglare effect can be obtained when the surface irregularity is formed with continuity or without intermission. The roughened surface of conventional antiglare materials, however, does not always satisfy the above mentioned various requirements in respects of the discontinuity in the distribution of the surface irregularities and relatively large height of and distance between the raised points of irregularity on the substrate surface.

SUMMARY OF THE INVENTION

The present invention has been completed as a result of the investigations undertaken by the inventors with an object to overcome the above described problems and disadvantages in the prior art. The object of the present invention is accordingly to provide a novel and improved display exhibiting an excellent antiglare effect by preventing imaging reflection of external light sources such as the sun, fluorescent lamps and the like on the imaging screen of the display and capable of giving sharp display images of high resolution without glittering and also to provide an antiglare material suitable for use on a full-color display screen. The present invention also has an object to provide a polarizing film by utilizing the above mentioned antiglare material.

Namely, the present invention provides an antiglare material which is a transparent substrate of which at least one of the surfaces is roughened, the surface roughness of the roughened surface being defined by the inequalities $$80Ra \leq Sm \leq 1000Ra, \quad (1)$$

$$Sm \leq 50, \quad (2)$$

and $$0.03 \leq Ra \leq 0.30, \quad (3)$$

in which Sm is the average distance between irregularity protrusions in $\mu$m and Ra is the center line average height of the surface irregularities in $\mu$m.

Further, the polarizing film of the present invention is a laminate consisting of a first protective layer which is an antiglare material of which one of the surfaces is roughened to satisfy the above given inequalities (1) to (3) for the surface roughness and a second protective layer laminated onto the unroughened surface of the first protective layer with intervention of a polarizing substrate therebetween.

It is preferable in the antiglare material and the polarizing film utilizing the same defined above that the haze value of each of the transparent substrate and the first protective layer is in the range from 1 to 25 and that the transparent substrate and the first or the second protective layer is a transparent film.

It is noted that the above given parameters for the surface roughness are defined each according to the definition specified in JIS B0601 and the definition of the haze value is given by JIS K7105.

DETAILED DESCRIPTION OF THE PREFERRED EMBODIMENTS

Figure 1:
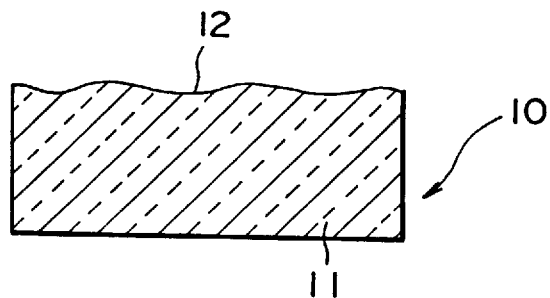
FIG. 1 is a schematic cross sectional view of the antiglare material according to the invention.

Following is a detailed description of some embodiments of the present invention.

The transparent substrate used in the antiglare material of the present invention can be a conventional plastic film, glass plate and the like having high transmissivity to light. Some of the examples of the transparent substrate suitable for the purpose include films of a polymeric resin such as polyethylene terephthalate (PET), cellulose triacetate, polyimide, polyether, polycarbonate, polysulfone, cellophane, aromatic polyamide, polyethylene, polypropylene and the like and plates of a glassy material such as fused silica glass, soda glass and the like.

Although it is desirable that the light transmissivity of these transparent substrates is as high as possible, the light transmissivity determined according to JIS C6714 should be at least 80% or, preferably, at least 90%. When the transparent substrate is for an antiglare material mounted on a small and light-weight liquid crystal display device, the transparent substrate is preferably a plastic film. While it is a desirable condition that the thickness of the transparent substrate is as thin as possible from the standpoint of decreasing the overall weight, the thickness should be in the range from 1 $\mu$m to 5 mm in consideration of the productivity and other factors of the antiglare material.

The antiglare material of the present invention is obtained by roughening one or both of the surfaces of the transparent substrate to such an extent that the surface roughness of the roughened surface satisfies the following inequalities (1) to (3) given in terms of the parameters Ra and Sm defined in JIS B0601:

$$80Ra \leq Sm \leq 1000Ra, \quad (1)$$

$$Sm \leq 50, \quad (2)$$

and $$0.03 \leq Ra \leq 0.30, \quad (3)$$

in which Sm is the average distance between irregularity protrusions formed by the roughening treatment of the substrate surface given in the unit of $\mu$m and Ra is the center line average height of the surface irregularities on the thus roughened surface given also in the unit of $\mu$m. It is preferable that the value of Ra is in the range from 0.03 to 0.20 $\mu$m.

The antiglare effect exhibited by the antiglare material is unduly low when Sm is larger than 1000Ra or when Sm is smaller than 80Ra. The antiglare effect is also insufficient when Sm exceeds 50 $\mu$m. The glittering phenomenon of the displayed images would be strong when Ra exceeds 0.30 $\mu$m while no sufficient antiglare effect can be exhibited when Ra is smaller than 0.03 $\mu$m.

Figure 5:
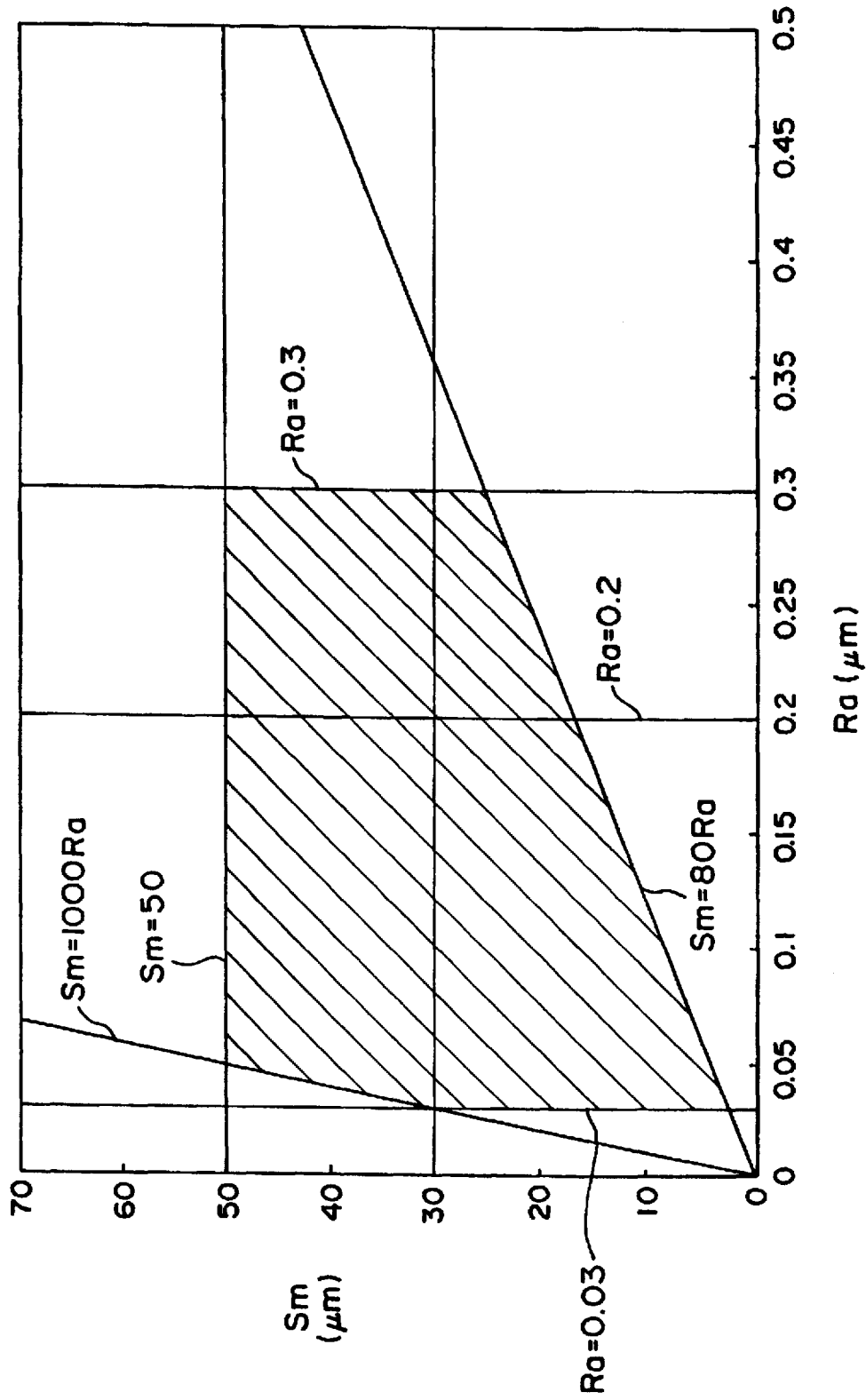
FIG. 5 is a diagram showing the range of the surface roughness parameters of the roughened surface in the inventive antiglare material.

It is essential that the surface roughness of the roughened surface or surfaces of the inventive antiglare material satisfies all of the above given inequalities (1) to (3). FIG. 5 of the accompanying drawing is a correlation diagram showing a hatched area in which each of the parameters Sm on the ordinate and Ra on the abscissa must fall in order to satisfy the above mentioned requirement.

It is further a preferable condition that the antiglare material of the invention has a haze value in the range from 1 to 25 according to the definition specified in JIS K7105. This limitation is important for the display to exhibit high performance because, when the haze value is lower than 1, a decrease is caused in the antiglare effect while, when the haze value exceeds 25, the contrast of the images would be decreased so that good visibility of the displayed images can hardly be obtained. The haze value here implied is a parameter to express the degree of haziness of a transparent material and can be obtained by the measurement using an integrating sphere light transmissivity photometer to give the diffusion transmission Hd % and the overall light transmission Ht %, from which the haze value can be calculated by the equation:

(haze value)=Hd/Ht×100.

The surface of the transparent substrate can be roughened by a conventional roughening method to give the inventive antiglare material. The roughened surface of the transparent substrate can be obtained by several different methods including a method of etching and a method of single layer or multilayer coating of the substrate surface with a coating composition or ink containing fine filler particles dispersed therein, optionally, together with water or an organic solvent by a coating technique such as air doctor coating, blade coating, knife coating, reverse coating, transfer roll coating, gravure roll coating, kiss coating, cast coating, spray coating, slot orifice coating, calender coating, electrodeposition coating, dip coating, die coating and the like or a printing technique such as letterpress printing, e.g., flexo printing, and planographic printing, e.g., offset printing as well as screen printing, a powder coating method such as electrostatic powder coating and powder electrodeposition coating. A plastic resin film having a roughened surface can be obtained from a molding resin composition consisting of a thermoplastic resin and an organic or inorganic filler by the extrusion molding or injection molding of a melt of the resin composition under heat and pressure.

The polymeric resin used in the above mentioned surface roughening method include resins soluble in an organic solvent exemplified by epoxy resins, polyolefin resins such as polyethylene, polypropylene, polybutylene and polybutadiene, acrylic resins such as polymethyl methacrylate and copolymers of ethylene and ethyl acrylate, styrene-based resins such as polystyrene, AS resins, BS resins and ABS resins, vinyl resins such as polyvinyl chloride, polyvinylidene chloride, polyvinyl acetate, ethylene-vinyl acetate copolymers, polyvinyl butyral, vinylidene chloride-acrylonitrile copolymers, vinyl chloride-vinyl acetate copolymers, vinyl chloride-vinylidene chloride copolymers and propylene-vinyl chloride copolymers, polyamide resins such as nylon 6, nylon 66 and nylon 12, saturated polyester resins, polycarbonate resins, polyacetal resins, polyphenylene oxide resins, polyphenylene sulfide resins, polysulfone resins, polyurethane resins, fluorocarbon resins such as polytetrafluoroethylene, polytrifluoroethylene and polyvinylidene fluoride, cellulose-based resins such as ethyl cellulose, cellulose acetate and nitrocellulose, ionomer resins and rosin-derived resins, optionally, in the form of an aqueous emulsion and water-soluble resins exemplified by gelatin, glue, hydroxyethyl cellulose, carboxymethyl cellulose, methyl cellulose, carboxymethyl hydroxyethyl cellulose, hydroxyethyl starch, gum arabic, saccharose octaacetate, ammonium alginate, sodium alginate, polyvinyl alcohol, polyvinyl butyral, polyvinyl pyrrolidone, polyvinyl amine, polyethylene oxide, polystyrene sulfonic acid, polyacrylic acid, polyamides and isobutylene-maleic anhydride copolymers as well as rubbery polymers exemplified by natural rubber, isoprene rubbers, styrene-butadiene copolymeric rubbers,(SBR), butadiene rubbers, acrylonitrile-butadiene copolymeric rubbers, butyl rubbers, ethylene-propylene copolymeric rubbers, chloroprene rubbers, acrylic rubbers, chlorosulfonated polyethylene rubbers, hydrine rubbers, urethane rubbers, polysulfide rubbers, silicone rubbers and fluorocarbon rubbers as well as composites of these rubbers or one of these rubbers and an organic or inorganic material, thermosetting resins such as unsaturated polyesters, xylene resins, polyamideimide resins, silicone resins, polyimide resins, melamine resins, furan resins, urea resins, phenol resins, phenol-formaldehyde resins, polyester amino resins and alkyd resins and ultraviolet-curable and electron beam-curable resins based on various kinds of acrylic, epoxy, vinyl ether or polyene thiol resins. These resins also should have transparency as high as possible and the light transmissivity thereof according to JIS C6714 should be at least 80% or, preferably, at least 90% as in the transparent substrate.

Further, the fillers used in the above mentioned surface roughening treatment include inorganic white pigments such as silica, calcium carbonate, aluminum hydroxide, magnesium hydroxide, clay, talc and titanium dioxide and white or transparent organic pigments such as acrylic resins, polystyrene resins, polyethylene resins, epoxy resins, silicone resins and beads. It is optional that these fillers are compounded with additives such as thickening agents, levelling agents, curing agents and the like with an object to improve the coating workability or printability of the coating composition or ink.

In the next place, the polarizing film of the invention is described in detail.

The polarizing film of the invention is a laminate comprising a polarizing substrate and the above described antiglare material as a first protective layer consisting of a transparent substrate having a roughened surface and formed on at least one surface of the polarizing substrate. The polarizing substrate used here is made from a material capable of being formed in the form of a transparent film including, in particular, polyvinyl alcohol, polyvinylene and the like. The polarizing substrate usable here is a film obtained by stretching these polymeric materials. A particularly preferable dichroic element is a film of polyvinyl alcohol, referred to as PVA hereinafter, obtained by uniaxial stretching of a PVA film having iodine or a dye adsorbed thereon.

The polarizing film of the invention has a laminated structure consisting of the above mentioned polarizing substrate in the form of a film, a first protective layer which is the above mentioned transparent substrate having a roughened surface bonded to one of the surfaces of the polarizing substrate and a second protective layer bonded to the other surface of the polarizing substrate. As a preferable example of the laminated structure, namely, a polarizing substrate is first prepared by immersing a film, which is obtained by the uniaxial stretching of a PVA film by 300% to 400%, in a solution containing higher-order iodine ions and the iodine-containing PVA film as the polarizing substrate is laminated with the first and second protective layers each bonded to one of the surfaces of the polarizing substrate by using an adhesive. The PVA film obtained in the above described manner is defective because the film is readily ruptured due to the relatively low mechanical strength and exhibits a large shrinkage by the changes in the humidity while this deficiency can be remedied by laminating the PVA film with the protective layers on both surfaces. Each of these protective layers can be formed from a transparent polymer film such as cellulosic films of cellulose triacetate and the like, polyester films and polycarbonate films. It is preferable that these films are imparted with increased water resistance by the use of a gelation agent such as boric acid and the like, by a heat treatment or by a formalization treatment.

The following is a description of the inventive antiglare material and polarizing film by making reference to the accompanying drawing.

Figure 2:
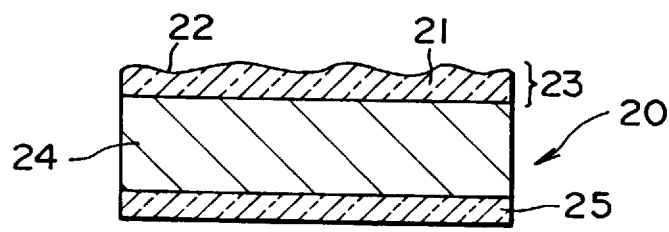
FIG. 2 illustrates the structure of the inventive polarizing film utilizing the antiglare material by a schematic cross sectional view.

FIG. 1 illustrates the antiglare material of the invention consisting of a transparent substrate by a schematic cross sectional view showing that one of the surfaces of the transparent substrate is a roughened surface. In FIG. 1, the transparent substrate 11 forming the antiglare material 10 has one of the surfaces 12 roughened as is illustrated. FIG. 2 illustrates the laminated structure of the inventive polarizing film 20 by a schematic cross sectional view, in which a polarizing substrate 24 is sandwiched between a first protective layer 21 having a roughened surface 22, i.e. an antiglare material 23, and a second protective layer 25.

Figure 3:
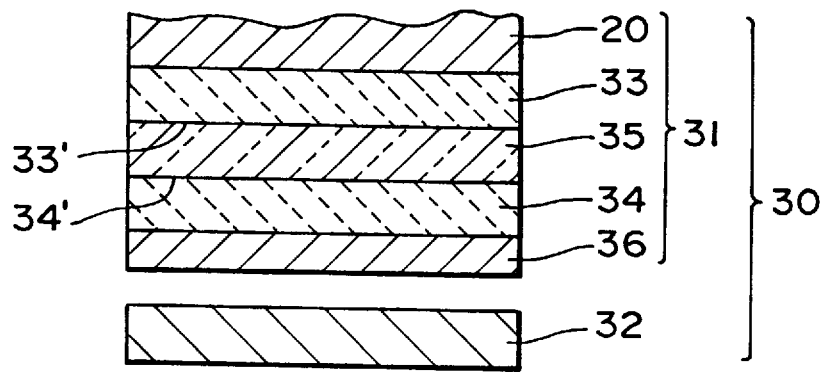
FIG. 3 illustrates the structure of a liquid crystal display device equipped with the polarizing film utilizing the antiglare material of the invention by a schematic cross sectional view.

FIG. 3 illustrates a schematic cross sectional view showing the structure of a liquid crystal display device 30 utilizing the polarizing film shown in FIG. 2 which exhibits an improved antiglare effect. This liquid crystal display device 30 is constructed from the liquid crystal panel 31 and the backlight source 32 such as a light-conductive device (electroluminescence panel), panel and the like below the liquid crystal panel 31 which can be formed, for example, with a twisted nematic (TN) liquid crystal cell and the like.

The TN liquid crystal cell above mentioned has a layered structure in which a nematic liquid crystal 35 fills the space between two glass substrates 33, 34 each provided with a patterned transparent electrode 33', 34' coated with a polyimide solution to form an orientation film followed by a rubbing procedure to effect orientation, the peripheries of the glass substrates being sealed with an epoxy resin and the like. Orientation of the nematic liquid crystal 35 with 90° twisting is caused by the orienting effect of the orientation films. A polarizing film 20 having a roughened surface as illustrated in FIG. 2 is mounted on the surface of one of the glass substrates 33 forming this TN liquid crystal cell opposite to the backlight source 32 while another polarizing film 36 having no roughened surface is mounted on the surface of the glass substrate 34 facing the backlight source 32 in such a fashion that the polarization angles of the two polarizing films 20, 36 are twisted each from the other by an angle of 90° to complete the liquid crystal panel 31.

When driving signals are applied to the transparent electrodes of the TN liquid crystal panel, an electric fields is generated between the electrodes to which the signals are applied so that the liquid crystal molecules are aligned with their longer axes in parallel to the direction of the electric field by means of the electronic anisotropy of the liquid crystal molecules and the optical rotatory power of the liquid crystal molecules is lost. As a consequence, the liquid crystal panel is brought into a condition not to permit transmission of light. The image display is recognized as visual information due to the contrast of the image produced by the difference in the light transmission. Namely, the liquid crystal display 30 can display images by the image contrast between the areas where the incident light can be transmitted and the areas where the incident light cannot be transmitted over the liquid crystal panel 31.

Figure 4:
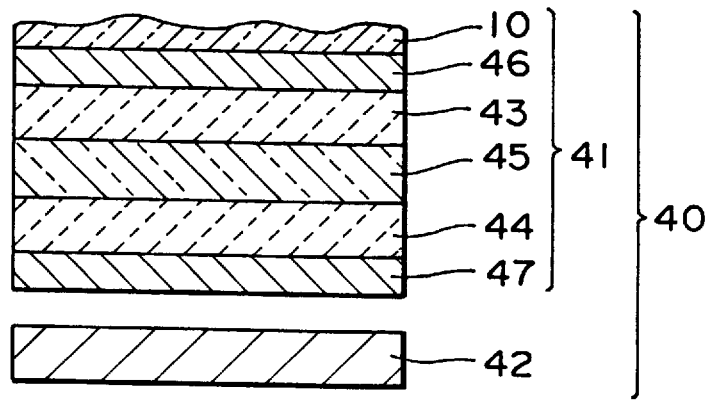
FIG. 4 illustrates the structure of another liquid crystal display device equipped with the polarizing film utilizing the antiglare material by a schematic cross sectional view.

FIG. 4 illustrates the structure of the liquid crystal display of a different embodiment by utilizing the antiglare material 10 of the invention by a schematic cross sectional view, in which the liquid crystal panel 41 is constructed from the two glass substrates 43, 44 sandwiching a layer of a nematic liquid crystal 45, the upper polarizing film 46 having no roughened surface and lower polarizing film 47 also having no roughened surface each positioned outside of one of the glass substrates 43, 44 and the antiglare film 10 laminated onto the upper polarizing film 46. The liquid crystal display 40 is formed from the liquid crystal panel 41 and the backlight source 42 bonded to the lower surface of the panel 41.

FIG. 5 is a diagram showing the range of the surface roughness parameters of the antiglare material of the invention and the polarizing film by the use thereof. While at least one of the surfaces of the transparent substrate is roughened, namely, the parameters representing the surface roughness of the thus roughened surface must satisfy the relationships expressed by the above given inequalities (1) to (3) and graphically must fall within the hatched area exhibited in the figure.

The antiglare material of the present invention is formed from a transparent substrate of which at least one of the surfaces is roughened so as to have a surface roughness expressed by the parameters, which are defined each by the definition specified in JIS B0601, satisfying the inequalities (1) to (3). The thus formed antiglare material of the invention exhibits an excellent antiglare effect and, when mounted on an image display such as CRTs and LCDs, serves to give a sharp image with high resolution and high contrast without glittering. In addition, the polarizing film by the use of such an antiglare material is useful as an image display such as liquid crystal panels and the like because of the good antiglare effect and the excellent image contrast without glittering exhibited thereby.

EXAMPLES

In the following, the present invention is illustrated in more detail by way of examples, in which the term of "parts" always refers to "parts by weight".

Example 1.

An antiglare material was prepared by printing, in the UV offset printing process, on a 80 μm thick transparent substrate of cellulose triacetate with a light transmission of 92% by using a PS plate having a mesh point pattern formed of circular dots each having a diameter of 20 μm and distributed at a pitch, i.e. the distance between the center points of two adjacent dots, of 30 μm and a UV Ink (trade name: Peelable OP Varnish UP-2, a product by T&K TOKA Co.). The antiglare material had a roughened surface having surface roughness expressed by Ra=0.10 μm and Sm=35 μm and the haze value thereof was 8.9.

Example 2.

An antiglare material having a haze value of 6.3 and having a roughened surface with surface roughness expressed by Ra=0.08 μm and Sm=40 μm was prepared by roughening one of the surfaces of a 80 μm thick cellulose triacetate film having a light transmission of 92% as a transparent substrate by the photoresist etching method using a photoresist composition (BR-370, a product by Asahi Denka Co.) and methyl ethyl ketone as the etching liquid.

Example 3.

A coating composition was prepared by uniformly blending 95 parts of a solution containing 50% of a silicone-modified alkyd melamine resin (AVE 33S, a product by Nippon Kako Toryo Co.), 5 parts of a silica pigment (Sylysia #435, a product by Fuji Silysia Chemical Co.) and 205 parts of Butyl Cellosolve in a mixing machine for 30 minutes. An antiglare material having a haze value of 23.5, of which one of the surfaces was roughened to have surface roughness expressed by Ra=0.18 μm and Sm=25 μm, was prepared by coating a surface of a 80 μm thick film of cellulose triacetate having a light transmission of 92% as a transparent substrate with the above prepared coating composition by the method of reverse coating in a coating amount of 4 g/m2 as dried followed by drying at 125° C. for 2 minutes.

Example 4.

An antiglare material was prepared in the same manner as in Example 3 excepting replacement of the cellulose triacetate film with a 50 μm thick film of polyethylene terephthalate having a light transmission of 89%.

Comparative Example 1.

An antiglare material was prepared in the same manner as in Example 3 except that the amount of the silica filler compounded in the coating composition was increased from 5 parts to 10 parts. The antiglare material had a haze value of 57 and the surface roughness of the roughened surface was expressed by Ra=0.22 μm and Sm=15 μm.

Comparative Example 2.

An antiglare material having a haze value of 30, of which the roughened surface had a surface roughness expressed by Ra=0.50 μm and Sm=50 μm was prepared by subjecting one of the surfaces of a 80 μm thick film of cellulose triacetate having a light transmission of 92% to an embossing treatment.

Comparative Example 3.

The antiglare material in this comparative example subjected to the test was the 80 μm thick film of cellulose triacetate as such.

Each of the antiglare materials 10 obtained in Examples 1 to 3 and Comparative Examples 1 to 3 was used as the first protective layer in the polarizing film 20 having a structure illustrated in FIG. 2. In the next place, the polarizing film 20 was applied and bonded to the liquid crystal panel 31 shown in FIG. 3 to give a liquid crystal display 30. Besides, the antiglare material 10 obtained in Example 4 was bonded at the uncoated surface of the polyethylene terephthalate film to a polarizing film having no roughened surface with intervention of a pressure-sensitive adhesive to give a laminated body, which was applied and bonded to the liquid crystal panel 41 illustrated in FIG. 4 to give a liquid crystal display 40.

The image size of these liquid crystal displays was 10.4 inches and resolution of the image was 640 dots by 480 dots. Evaluation tests of these liquid crystal displays were undertaken for the items including image contrast, image glittering and antiglare effect.

Figure 6:
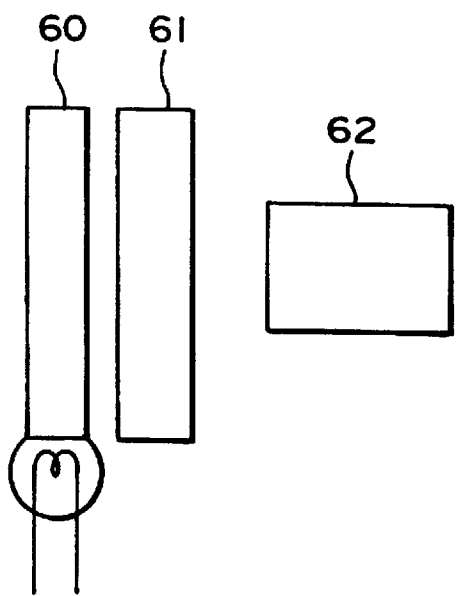
FIG. 6 is a schematic illustration of the arrangement in the apparatus for the measurement of the image contrast.

Evaluation of the image contrast was undertaken according to the procedure specified in JIS C7072-1988 for the testing method of the contrast ratio (CR) of liquid crystal display panels. FIG. 6 of the accompanying drawing schematically illustrates the relative positions of the light source 60, liquid crystal panel 61 and photometer 62 used in the measurement of the image contrast. The distances between the light source 60 and liquid crystal panel 61 and between the liquid crystal panel 61 and photometer 62 were 1 cm and 50 cm, respectively, and the aperture angle of the photometer 62 was 5 degrees. The light source was an electroluminescence panel of 5 watts output and the photometer was Model LS-100 manufactured by Minolta Camera Co. The results of the image contrast measurement were recorded in four ratings of A, B, C and D when the CR value was 4 or higher, 3 or higher but lower than 4, 2 or higher but lower than 3, and lower than 2, respectively.

Glittering of the images due to moire-image fringes was evaluated in an organoleptic method by the visual inspection undertaken by 100 panel members in which the liquid crystal display 30 was connected to a personal computer to exhibit the opening pattern of the paint brush by the Windows, Version 3.1 in black-and-white and each of the panel members was requested to visually detect appearance of glittering. The results were recorded in three ratings of A, B and C when the number of the panel members who detected glittering was 29 or smaller, between 30 and 69 or 70 or larger, respectively.

Antiglare effect was evaluated also in an organoleptic method by the visual inspection undertaken by 100 panel members, in which each of the panel members was requested to find imaging reflection of his or her own face under lighting with a 40 watts fluorescent lamp when he or she faced the liquid crystal display in a black-exhibiting condition perpendicularly at a distance of 50 cm. The results were recorded in three ratings of A, B and C when the number of the panel members who could not find imaging reflection was 70 or larger, between 30 and 69 or 29 or smaller, respectively.

Table 1 below summarizes the surface roughness parameters and haze value of the liquid crystal display panels and the results of the above described evaluation tests.

TABLE 1

| Antiglare material | Ra, $\mu$m | Sm, $\mu$m | Haze value | Image contrast | Glittering | Antiglare effect |
| --- | --- | --- | --- | --- | --- | --- |
| Example 1 | 0.10 | 35 | 8.9 | A | A | A |
| Example 2 | 0.08 | 40 | 6.3 | A | A | A |
| Example 3 | 0.18 | 25 | 23.5 | B | A | A |
| Example 4 | 0.18 | 25 | 24.3 | B | A | A |
| Comparative Example 1 | 0.22 | 15 | 57.0 | D | A | B |
| Comparative Example 2 | 0.50 | 50 | 30.0 | C | C | A |
| Comparative Example 3 | 0.01 | 1000 | 0.1 | A | A | C |

What is claimed is:

1. An antiglare material which is a transparent substrate of which at least one of the surfaces is roughened, the surface roughness of said roughened surface being defined by the inequalities $$80Ra \leq Sm \leq 1000Ra,$$

$$Sm \leq 50,$$

and $$0.03 \leq Ra \leq 0.30,$$

in which Sm is the average distance between irregularity protrusions in $\mu$m and Ra is the center line average height of the surface irregularities in $\mu$m.

2. The antiglare material as claimed in claim 1 in which the roughened surface of the transparent substrate has a haze value in the range from 1 to 25.

3. The antiglare material as claimed in claim 1 in which the transparent substrate is a transparent film.

4. A polarizing film which is a laminate consisting of a first protective layer which is an antiglare material of which one of the surfaces is roughened to have surface roughness defined by the inequalities $$80Ra \leq Sm \leq 1000Ra,$$

$$Sm \leq 50,$$

and $$0.03 \leq Ra \leq 0.30,$$

in which Sm is the average distance between irregularity protrusions in $\mu$m and Ra is the center line average height of the surface irregularities in $\mu$m, and a polarizing substrate disposed between the unroughened surface of the first protective layer and a second protective layer.

5. The polarizing film as claimed in claim 4 in which the first protective layer has a haze value in the range from 1 to 25.

6. The polarizing film as claimed in claim 4 in which the first and second protective layers are each a transparent film.

* * * * *